United States Patent
Duncan

(10) Patent No.: US 9,512,605 B2
(45) Date of Patent: Dec. 6, 2016

(54) WAX FREE SYSTEMS WITH SPRINGS FOR NEW AND EXISTING TOILETS

(71) Applicant: Scott E Duncan, Santa Rosa, CA (US)

(72) Inventor: Scott E Duncan, Santa Rosa, CA (US)

(*) Notice: Subject to any disclaimer, the term of this patent is extended or adjusted under 35 U.S.C. 154(b) by 286 days.

(21) Appl. No.: 14/303,966

(22) Filed: Jun. 13, 2014

(65) Prior Publication Data
US 2015/0000020 A1  Jan. 1, 2015

Related U.S. Application Data

(60) Provisional application No. 61/840,682, filed on Jun. 28, 2013.

(51) Int. Cl.
| | | |
|---|---|---|
| E03D 11/17 | (2006.01) | |
| E03D 11/16 | (2006.01) | |
| F16L 23/16 | (2006.01) | |
| F16L 25/14 | (2006.01) | |
| F16L 23/00 | (2006.01) | |

(52) U.S. Cl.
CPC .............. *E03D 11/16* (2013.01); *F16L 23/003* (2013.01); *F16L 23/16* (2013.01); *F16L 25/14* (2013.01)

(58) Field of Classification Search
CPC ....... E03D 11/16; F16L 23/003; F16L 23/16; F16L 25/14
USPC ................................. 4/252.1–252.6
See application file for complete search history.

(56) References Cited

U.S. PATENT DOCUMENTS

| | | | |
|---|---|---|---|
| 1,335,056 A | 3/1920 | Hinsdale | |
| 1,594,350 A | 8/1924 | Boosey | |
| 5,291,619 A * | 3/1994 | Adorjan | E03D 11/16 4/252.1 |
| 6,789,275 B2 * | 9/2004 | Spells, Sr. | E03D 11/17 285/56 |
| 7,188,376 B2 * | 3/2007 | Ortiz | E03D 11/16 4/252.1 |
| 7,441,810 B2 * | 10/2008 | Buff | F16L 23/003 285/107 |
| 7,814,580 B2 * | 10/2010 | Coronado | E03D 11/16 4/252.1 |
| 9,062,445 B2 * | 6/2015 | Duncan | E03D 11/16 |
| 9,187,887 B2 * | 11/2015 | Coronado | E03D 11/16 |
| 2004/0128752 A1 * | 7/2004 | Atkins | E03D 11/17 4/252.6 |
| 2005/0108814 A1 * | 5/2005 | Thompson | E03D 11/17 4/252.6 |
| 2014/0026305 A1 * | 1/2014 | Coronado | E03D 11/16 4/252.6 |
| 2014/0366256 A1 * | 12/2014 | Coronado | E03D 11/14 4/252.6 |
| 2015/0322661 A1 * | 11/2015 | Duncan | E03D 11/16 29/890.141 |
| 2015/0376887 A1 * | 12/2015 | Coronado | E03D 11/16 29/890.141 |

* cited by examiner

*Primary Examiner* — Christine Skubinna
(74) *Attorney, Agent, or Firm* — Steven A. Nielsen; www.NielsenPatents.com

(57) ABSTRACT

A wax free pop-up seal 450 may be integrated with a spring 200 or other resilient component to connect a toilet to an existing soil pipe flange 325. A pop-up seal system 100 provides toolless, nondestructive and seamless height adjustment and comports with both smaller and larger diameter soil pipe flanges. For retro fit installations, a pop-up seal may comprise extended fins 471 for use with larger diameter soil pipe flanges and for use with smaller diameter soil pipe flanges, the extended fins may be removed. For new construction a new soil pipe flange is provided and a customized pop-up seal 600 comprises a seal system well suited for the new soil pipe flange. The pop-up seals may operate with or without springs or other external flexible components.

8 Claims, 14 Drawing Sheets

WAX FREE SYSTEMS WITH SPRINGS FOR NEW AND EXISTING TOILETS

CROSS-REFERENCE TO RELATED APPLICATIONS

This is a utility application based upon U.S. patent application Ser. No. 61/840,682 filed on Jun. 28, 2013. This related application is incorporated herein by reference and made a part of this application. If any conflict arises between the disclosure of the invention in this utility application and that in the related provisional application, the disclosure in this utility application shall govern. Moreover, the inventor(s) incorporate herein by reference any and all patents, patent applications, and other documents hard copy or electronic, cited or referred to in this application.

BACKGROUND OF THE INVENTION (1) Field of the Invention

The invention generally relates to wax free toilet installation systems. More particularly, the invention relates to wax free means and methods of attaching a soil pipe to a toilet in new construction or in a retrofit configuration with use of springs and/or pop-up flexible seals or rubber gaskets.

(2) Related Art

Other wax free toilet installation systems and sleeve type configurations are known in the related art. But, the related art fails to provide a kit system providing a plumber means and methods of installing an adjustable height wax free system in either new construction and for retrofit applications. In the related art, existing pipe flange units are presented in various sizes and require a plumber to stock and transport a plethora of fittings. Also the related art fails to provide a seamlessly self-adjusting height system to comport with existing elevations of plumbing components.

The prior art fails to disclose, anticipate or suggest the use of lower seals to stop the flow of sewer gasses. For example, U.S. Pat. Nos. 1,335,056 and 1,594,350 would not be code compliant in modern construction, as the two patents fail to provide for, inter alia, sewer gas stoppage as now required in all current building codes.

In the related art, plumber may be presented with a 3, 3.5 or 4 inch soil pipe flange and thus need to purchase and transport hardware for all three sizes. Also, in the related art, a plumber may be presented with toilet heights of various sizes and thus needs to purchase and transport further hardware to fit such toilet heights. In repair or retrofit work soil pipe flange sizes and height requirements are often unknown before the plumber reaches the jobsite.

In the related art, in new construction or where a new soil pipe flange is desired, there are no known systems wherein a new soil pipe flange is specifically designed for wax free installations and there are no known pop-up seals that take advantage of a custom soil pipe flange.

Thus, there is a long felt need in the art for the presently disclosed embodiments.

BRIEF SUMMARY OF THE INVENTION

The present invention overcomes shortfalls in the related art by presenting an unobvious and unique combination and configuration of springs, soil pipe flanges and pop-up seals, and other components to artfully attach a toilet to a prior art soil pipe flange for a retrofit application and to install a new custom soil pipe flange and customized pop-up seal in a new construction environment.

The disclosed pop-up seals or new rubber gaskets overcome shortfalls in the art by providing an upward bias or upward pressure during attachment between a soil pipe flange and toilet horn. The upward bias of the pop-up seals makes the disclosed systems automatically adjust to varying soil pipe flange, floor and toilet heights. The upward bias may be achieved with or without springs or other added flexible component. In the prior art, such variables in elevation would require specialized tools and a multitude of fittings. The disclosed pop-up seals provide for quick and nondestructive height adjustments that are often needed in bathroom remodeling projects where finished floor heights are often subject to a home owner's fluid design choices.

Disclosed embodiments overcome shortfalls in the prior art by providing a new retrofit pop-up seal comprising extended fins in a lower seal area. The use of extended fins allows the retrofit pop-up seal to work with either smaller (three inch diameter) or larger (3.5 and 4 inch diameter) existing soil pipe flanges. When left in place, the extended fins fill an outer void and make the retrofit pop-up seal work large diameter closet flanges or soil pipe flanges without modification. For use with smaller diameter closet flanges, the extended fins are easily removed on site by use of a knife or other common cutting tool. Thus, for retrofit work, a plumber need purchase and transport just one retrofit pop-up seal. For further ease of installation, disclosed embodiments include both prefabricated pop-up seals for both larger and smaller diameter closet pipe flanges.

The disclosed retrofit system further overcome shortfalls in the related art by use of a new spring system, with springs that are wider in base and narrow on top. A wide base allows the bottom portions of the springs to rest upon the upper face of a preexisting soil pipe flange. The direct spring to soil pipe flange contact allows for greater ease in retrofit projects were the exact diameter of a soil pipe flange is unknown and where the top surface conditions of a soil pipe flange are also unknown. Thus, the wide bottom retrofit spring comports to any existing soil pipe flange while providing an upward bias to comport with unknown construction height requirements.

For new construction or remodeling wherein there is an opportunity to set a new soil pipe flange, a new soil pipe flange is disclosed and overcomes shortfalls in the prior art. The disclosed soil pipe flanges are well suited for use with either smaller or lager diameter soil pipes. On the bottom side, the disclosed soil pipe flanges are artfully configured to act as a male coupler for larger soil pipes or as a female coupler for smaller soil pipes. On the top side, the disclosed soil pipe flanges have an excellent inner bevel system that fits well with a new pop-up seal system. The new inner bevel system also overcomes shortfalls in the art by allowing the new pop-up seal system to flex downwardly into the inner bevel area which gives the pop-up seal a greater range of useable and adjustable height.

For new construction, the disclosed pop-up seal system overcomes shortfalls in the related art by a new spring system. The lower portion of a new spring system rests within a specially configured lower spring recess void defined within the pop-up seal. By allowing flexible tension within the new pop-up seal system, the pop-up seal remains firmly attached to the inside of the inner flange area of the new soil pipe flange. This configuration keeps the surface of the soil pipe flange clear and helps keep the pop-up seal centered within the soil pipe flange.

For new construction, the disclosed pop-up seal system overcomes shortfalls in the art by use of new lower seal section that may comprise an angle section to securely and compactly fit the pop-up seal into the inner confines of the new soil pipe flange.

These and other objects and advantages will be made apparent when considering the following detailed specification when taken in conjunction with the drawings.

Figure 1:
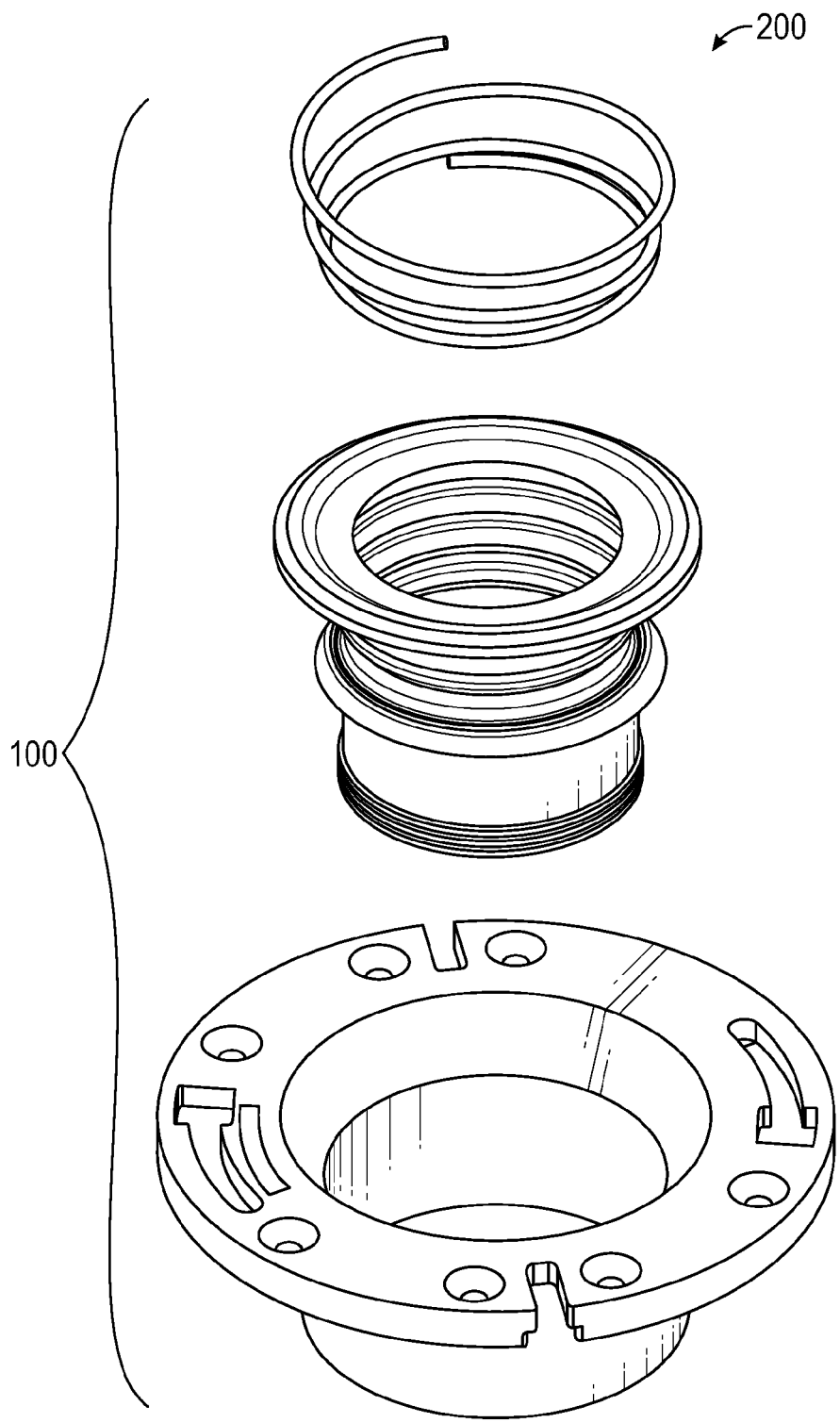
FIG. 1 depicts a perspective view of disclosed components for a retrofit embodiment

REFERENCE NUMERALS IN THE DRAWINGS 100 a disclosed embodiment for retro fit
150 a disclosed embodiment for new construction
200 a spring or other flexible component for use in retro fit
205 wide bottom portion of retrofit spring 200
207 narrow top portion of retrofit spring 200
250 a spring or other flexible component for use in new construction
255 top section or top end of spring 250 sometimes found or disposed within void 687 defined by the shoulder section 683 of a pop-up seal 600.
257 base section or bottom end of spring 250 sometimes found or disposed within spring void 720 of pop-up seal 600.
300 soil pipe flange sometimes found in existing construction with a larger 3.5 or 4 inch diameter
325 an existing soil pipe flange in general
350 soil pipe flange sometimes found in existing construction with smaller 3 inch diameter
370 a first soil pipe flange used in new construction
371 a surface face of a soil pipe flange
375 a second soil pipe flange used in new construction
380 an inner flange area comporting to an angle section 710 of a pop-up seal
382 a transition edge between an inner flange area 380 and the inner pipe section 383
383 inner pipe section of a soil pipe flange, the inner pipe section may comport to an angle section 710 of a pop-up seal
400 pop-up seal or rubber gasket for retrofit construction in three inch diameter pipe
450 a pop-up seal or rubber gasket in general for retrofit construction, may or may not have fins removed, may be used for any size of existing soil pipe flange
465 smooth barrel section of a retrofit pop-up seal 450
470 lower seal area of a retrofit pop-up seal 450
471 extended fins of a lower seal area 470
472 recessed sealing fins of a lower seal area 470
473 indent void defined by recessed sealing fins 472, extended fins 471 and flexible transition component 474
474 flexible transition component connected to extended fins 471 and recessed sealing fins
480 upper sealing lip of pop-up seal for retrofit construction
482 flexible transition component attached to the top leg 491 and shoulder area 483
483 shoulder area of upper sealing lip
484 upper bezel of shoulder area 483
485 upper protrusion of shoulder area 483
486 upper seal area of shoulder area 483
487 void to accept an upper end 207 of a spring 200, the void defined within the shoulder area 483 of a pop-up seal
490 concentric flexible rib area or a plurality of concentric flexible ribs
491 top leg of concentric flexible rib area
500 pop-up seal or rubber gasket for retrofit construction in four inch diameter pipe
600 pop-up seal or rubber gasket for new construction
680 upper sealing lip of pop-up seal or rubber gasket for new construction 682 flexible transition component attached to the top leg 691 and shoulder area 683
683 shoulder area of pop-up seal 600 or rubber gasket for new construction
684 upper bezel of shoulder area 483
685 upper protrusion of shoulder area 683
686 upper seal area of shoulder area
687 void or spring void for upper end 257 of spring 250, the void defined within the shoulder area 683
690 concentric flexible rib area of pop-up seal 680 for new construction
691 top leg of concentric flexible rib area
700 lower seal section of pop-up seal 600 for new construction
710 angle section of lower seal section 700
720 spring recess void defined within lower seal section 700
800 soil pipe

DETAILED DESCRIPTION OF EMBODIMENTS OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

Any and all the above references and U.S. patents and applications are incorporated herein by reference. Aspects of the invention can be modified, if necessary, to employ the systems, functions and concepts of the various patents and applications described above to provide yet further embodiments of the invention.

FIG. 1 depicts generally a disclosed embodiment 100 for retrofit use.

Figure 2:
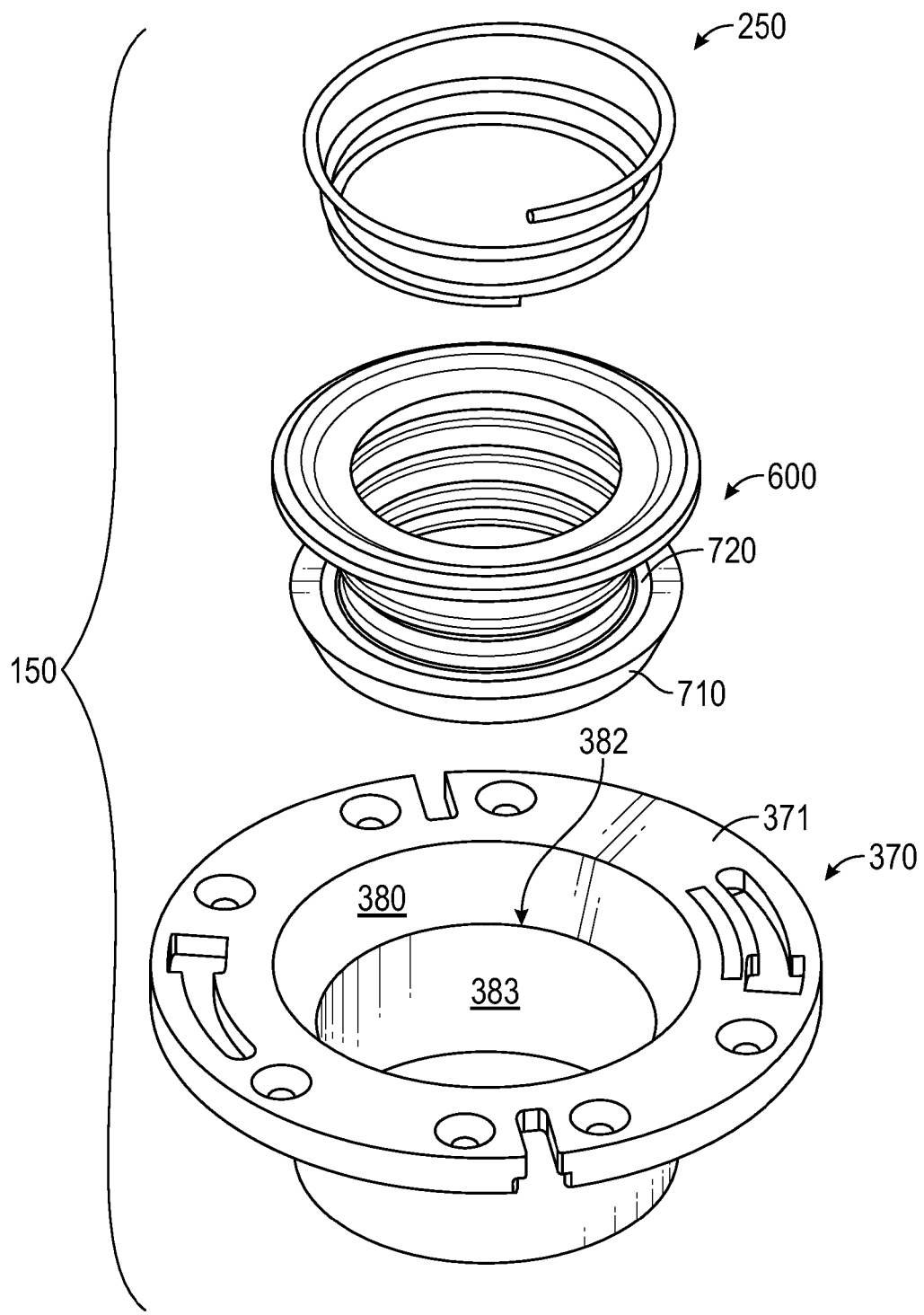
FIG. 2 depicts a perspective view of disclosed components for new construction

FIG. 2 depicts generally a disclosed embodiment 150 for use in new construction or where there is an opportunity to change out a soil pipe flange. A new soil pipe flange 370 may comprise surface face 371 connected to an inner flange area 380. The inner flange area 380 may comport with an angle section 710 of a pop-up seal 600. The angle section 710 may also be disposed within the inner pipe section 383 of the soil pipe flange.

The inner flange area 380 may attach to a transition edge 382 and an inner pipe section 383 may attach to the transition edge. In some embodiments, a pop-up seal may comprise an angle section 710 that may comport with the inner pipe section 383.

The pop-up seal 600, as well as all other seals disclosed herein may function without use of a spring or other external member.

FIG. 2 further depicts a spring 250. All springs disclosed herein may take the form or be comprised of any resilient member or component. All springs may be integrated within a pop-up seal. All pop-up seals may have their own independent means of tension or resilience and may function without a separate spring.

Figure 3:
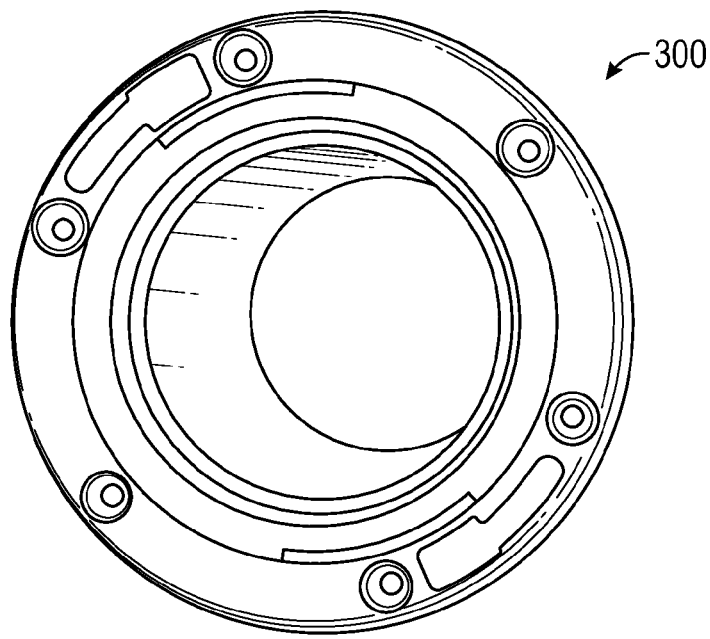
FIG. 3 depicts a perspective view of a soil pipe flange sometimes found in existing construction

FIG. 3 depicts a perspective view of a soil pipe flange 300 sometimes used in existing toilet installations. The depicted soil pipe flange may be used or found with larger 3.5 or 4 inch soil pipes.

Figure 4:
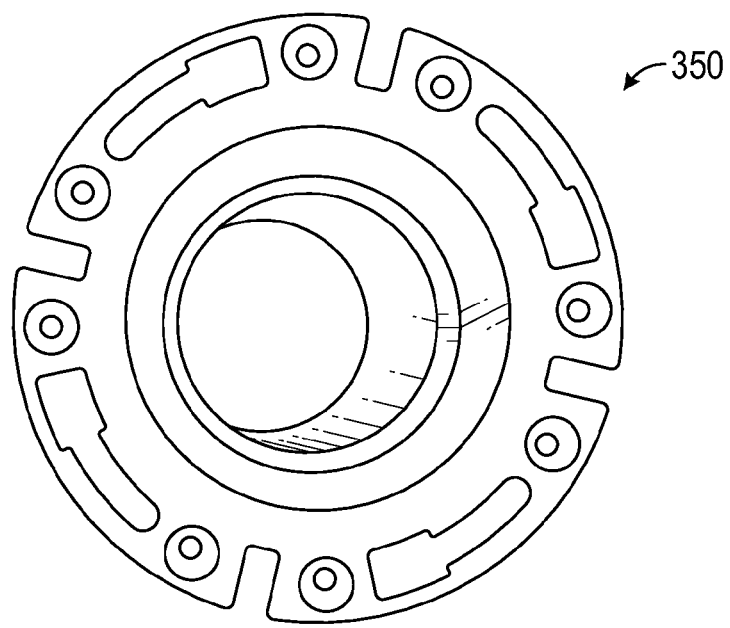
FIG. 4 depicts a perspective view of a soil pipe flange sometimes found in existing construction

FIG. 4 depicts a perspective view of a soil pipe flange 350 sometimes used in existing toilet installations. The depicted soil pipe flange may be used or found with smaller 3 inch soil pipes.

Figure 5:
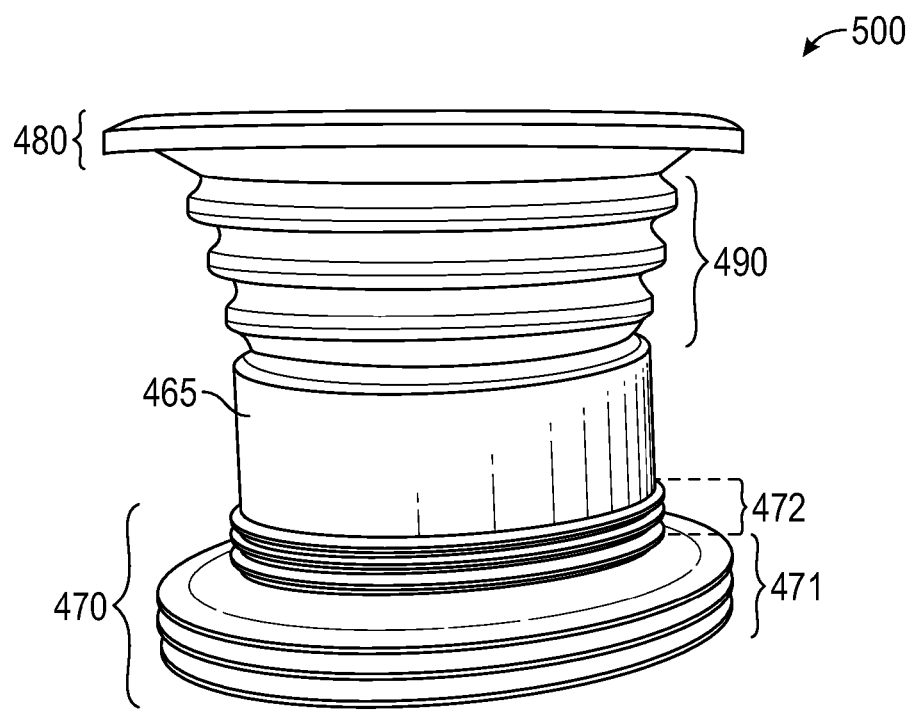
FIG. 5 depicts a pop-up seal or rubber gasket for retrofit construction in four inch diameter pipe

FIG. 5 depicts a perspective view of a pop-up seal 500 used in retrofit or existing construction. The pop-up seal may comprise a concentric flexible rib area 490 that assists in the seamless, toolless and nondestructive height adjustment of the upper sealing lip 480. A smooth barrel section 465 used in combination with the attached flexible rib area 490 and lower seal area 470 provides the correct balance of rigidity and flexible adjustment. The lower seal area 470 may comprise recessed sealing fins 472 and extended fins 471. For use in larger diameter soil pipe flanges, the extended fins 471 may be retained. For use in smaller diameter soil pipe flanges, the recessed sealing fins 472 may be used and the extended fins 471 are removed. This seal may operate with or without use of springs or other supplemental components.

Figure 6:
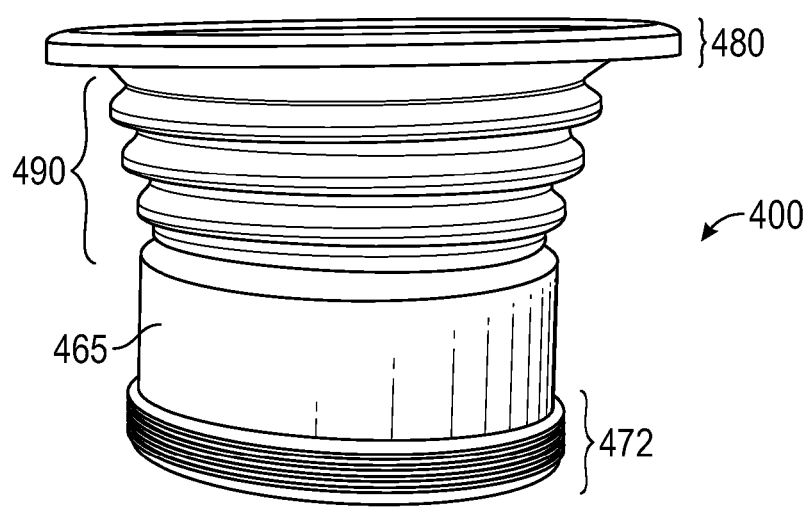
FIG. 6 depicts a pop-up seal or rubber gasket for retrofit construction with extended fins removed

FIG. 6 depicts either a custom pop-up seal manufactured without extended fins of FIG. 5 or the pop-up seal of FIG. 5 with the extended fins removed. Disclosed embodiments include the fabrication of both pop-up seals with extended fins and without extended fins.

Figure 7:
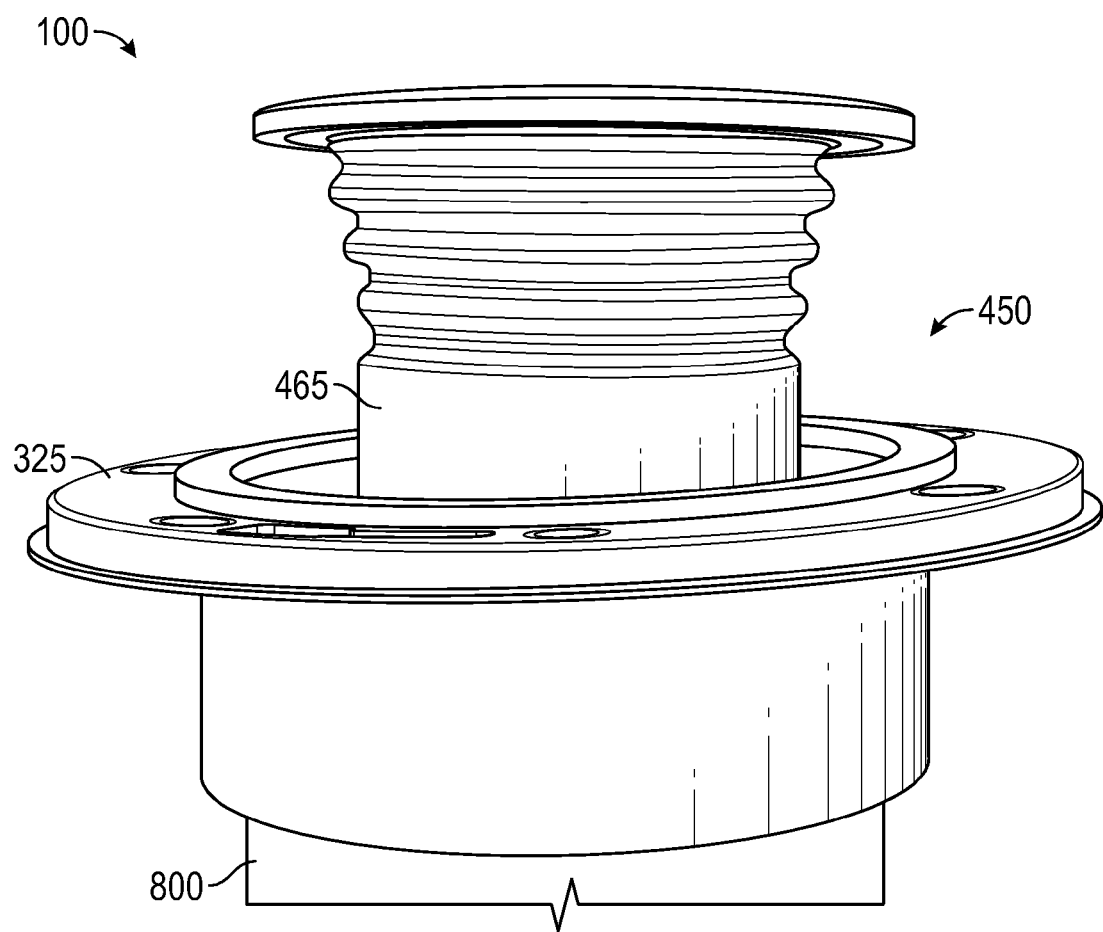
FIG. 7 depicts a perspective view of a retro fit pop-up seal

FIG. 7 depicts a perspective view of a retrofit system 100 comprising a pop-up seal 450 for retrofit construction and a general existing soil pipe flange 325. The soil pipe flange is shown in attachment to a soil pipe 800.

Figure 8:
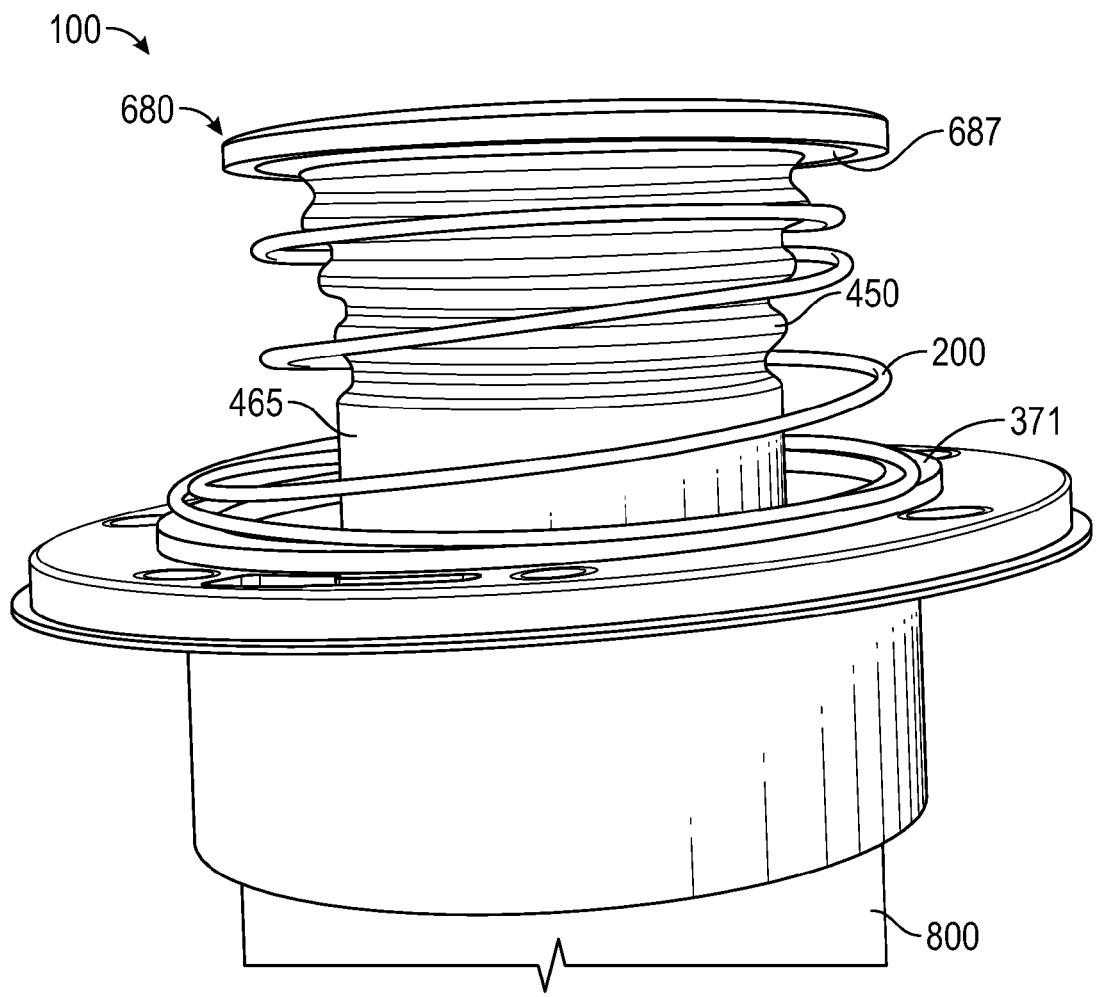
FIG. 8 depicts a perspective view of a retro fit pop-up seal with an integrated spring

FIG. 8 depicts a perspective view of a retrofit system, such as the system of FIG. 7, but with the addition of a spring 200. The spring 200 may rest upon an upper surface face 371 of the soil pipe flange.

Figure 9:
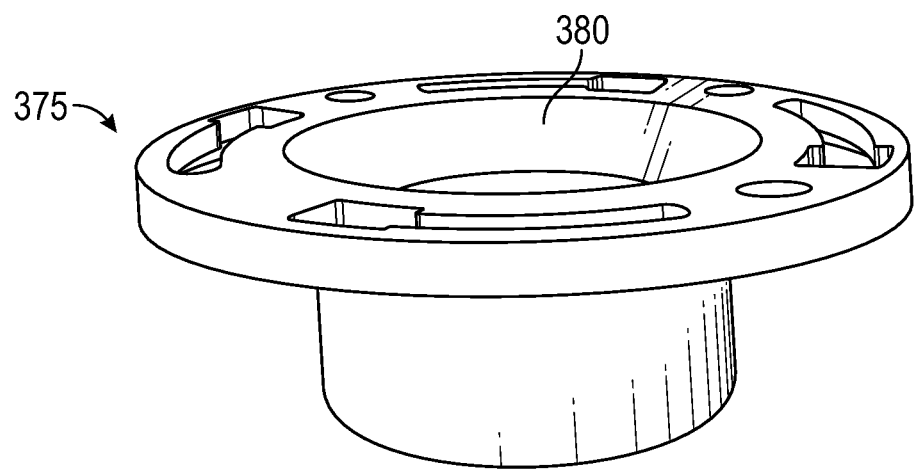
FIG. 9 depicts perspective view of a soil pipe flange used in new construction
Figure 10:
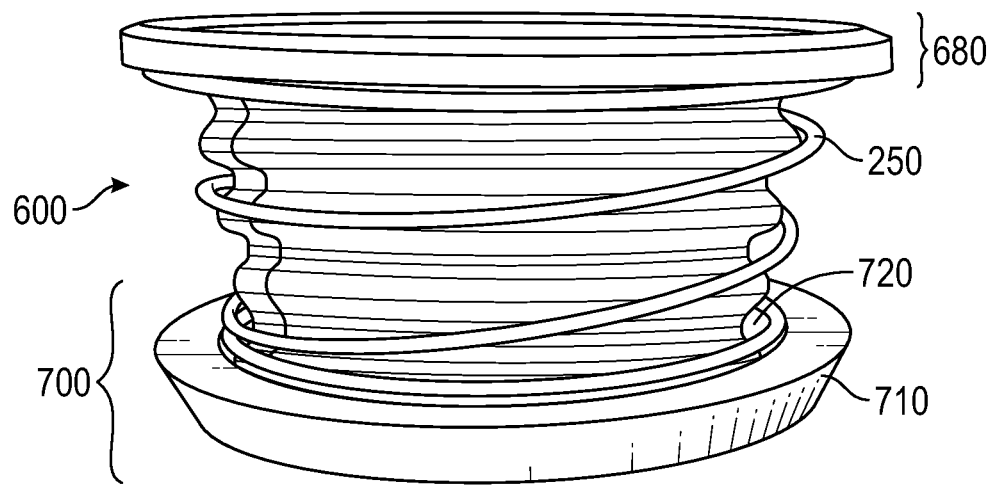
FIG. 10 depicts a pop-up seal or rubber gasket used for new construction and an integrated spring

FIG. 9 depicts a perspective view of a soil pipe flange 375 used in new construction or where a new soil pipe flange is needed. The new soil pipe flange overcomes shortfalls in the art by use of a new inner flange area 380 that comports or mates with an angle section 710 of a pop-up seal 600 as shown in FIG. 10. The angle section 710 may also be disposed within an inner pipe section of the soil pipe flange.

FIG. 10 depicts perspective view of a pop-up seal 600 for new construction used with a spring 250. Unlike the pop-up seal for retrofit construction, the pop-up seal for new construction features a lower seal section 700 that comprises or defines a spring recess 720 or void for retaining the lower coils of a spring. The use of a spring recess 720 provides advantages not found in the prior art as the spring 250 is contained within the pop-up seal and not subject to sliding upon the face of a soil pipe flange. The integration of the spring within the spring recess 720 allows the pop-up seal 600 to be deformed into a near flattened position, thus increasing the range of pop-up elevations. The pop-up seal overcomes shortfalls in the art by use of an upper sealing lip 680 that is larger in diameter than the lower seal section 700 which allows the pop-up seal to compactly compress within the confines of an inner flange area 380 of a soil pipe flange.

Figure 11:
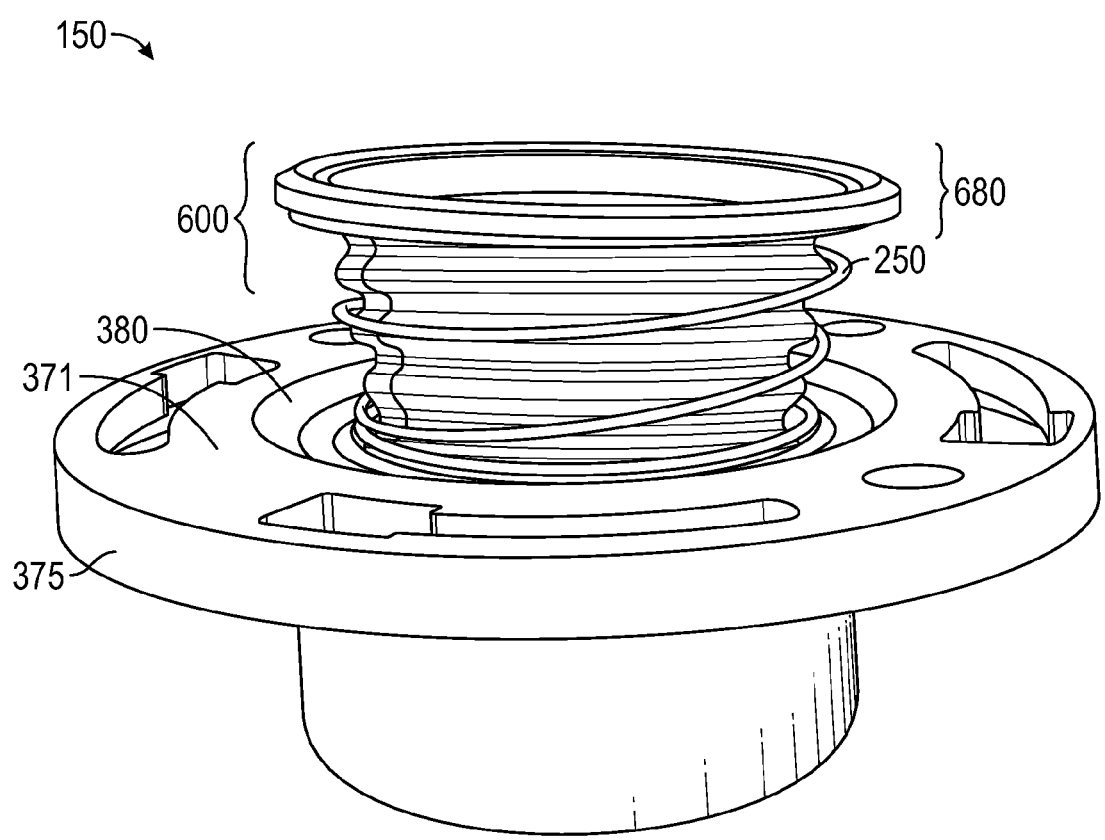
FIG. 11 depicts a new construction system

FIG. 11 depicts a new construction system and a perspective view of the components of FIG. 10 in an assembled condition. The configuration of the pop-up seal 600, spring 250 and a new construction soil pipe flange 375 allows for the spring and pop-up seal to be compressed within the inner voids of the soil pipe flange. In a most compressed position, the upper sealing lip 680 of the pop-up seal 600 may be disposed within the inner flange area 380. This feature overcomes shortfalls in the art by providing, if needed, a toilet installation flush with the upper surface or surface face 371 of the soil pipe flange. Thus, the disclosed configurations of the spring 250, pop-up seal 600 and soil pipe flange provide unique and new advantages that overcome shortfalls in the prior art.

Figure 12:
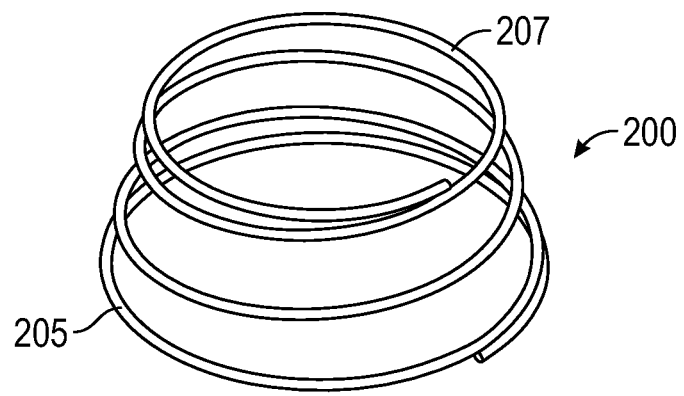
FIG. 12 depicts a perspective view of a spring or other resilient component for retro fit systems
Figure 13:
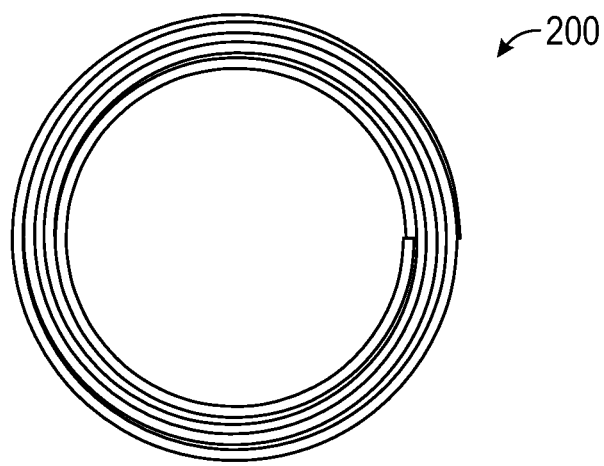
FIG. 13 depicts a plan view of a spring or other resilient component for retrofit systems
Figure 14:
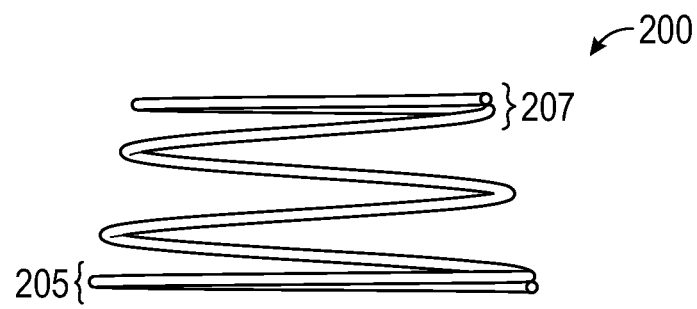
FIG. 14 depicts an elevation view of a spring or other resilient component for retrofit systems

FIGS. 12, 13 and 14 provide various views of a unique spring 200 used with the disclosed retrofit systems. The retrofit spring 200 has a wider base 205 and a narrower top end 207. This configuration overcomes shortfalls in the related art by allowing the bottom portion 255 of the spring to sit upon an upper surface or surface face of a soil pipe flange. Thus, the wider base allows for more versatility in retrofit systems were unknown sizes of soil pipe flanges will be encountered at jobsites. The narrow top end 207 overcomes shortfalls in the art by providing an artful integration with an upper sealing lip of a pop-up seal.

Figure 15:
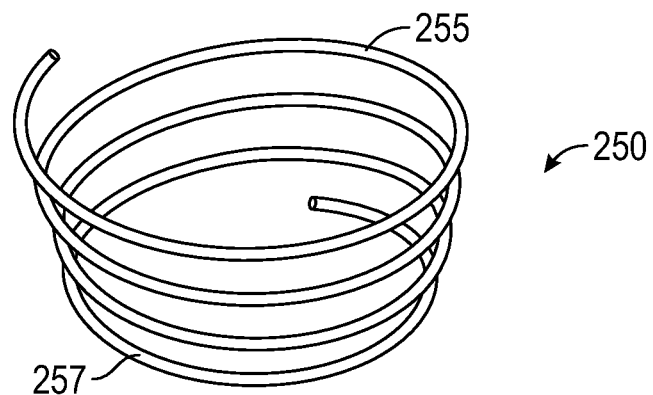
FIG. 15 depicts a perspective view of a spring or other resilient component for new construction
Figure 16:
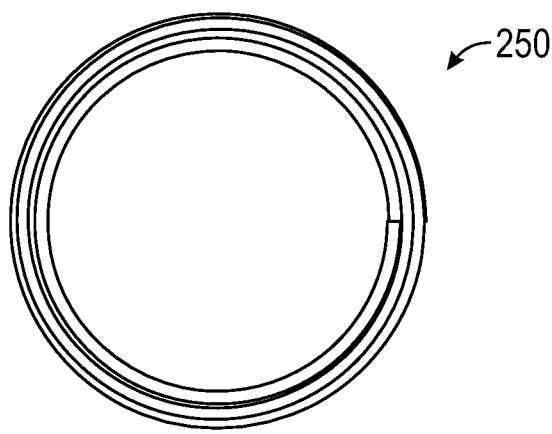
FIG. 16 depicts a plan view of a spring or other resilient component for new construction
Figure 17:
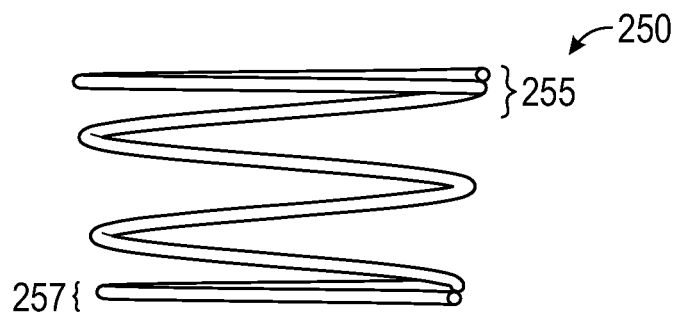
FIG. 17 depicts an elevation view of a spring or other resilient component for new construction.

FIGS. 15, 16 and 17 provide various views of a unique spring 250 used with the disclosed systems for new construction. The new construction spring 250 has a top section 255 that is slightly wider than the bottom end 257 or base section. The top end 255 and the base section 257 may be considered substantially similar in width. This configuration overcomes shortfalls in the art as the spring 250 base section fits or integrates with the spring recess void 720 of the pop-up seal. This bottom side spring integration overcomes shortfalls in the art as the bottom side of the spring does not sit upon the top surface of a soil pipe flange, which could allow slippage, wear or damage to the spring or soil pipe flange top surface.

The top end 255 or top configuration of the spring 250 overcomes shortfalls in the related art by artfully integrating with or within a void 687 (FIG. 8 and FIG. 29) defined within the shoulder area 683 of the pop-up seal (FIG. 8 and FIG. 29) The void 687 or spring void may accept the top end 255 of the spring to urge the pop-up seal upwardly to create a seal with a toilet or toilet horn. The position of the spring void allows the spring to urge the pop-up seal in an advantageous outer and upper position against or into a toilet or toilet horn. This configuration overcomes shortfalls in the art by providing a secure wax-fee toilet installation.

Figure 18:
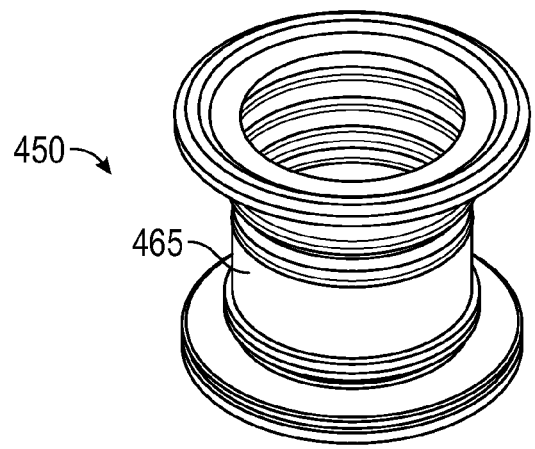
FIG. 18 depicts a perspective view of a pop-up seal for retrofit construction

FIG. 18 depicts a perspective view of a pop-up seal 450 used for retrofitting with an existing soil pipe flange. The retrofit pop-up seal comprises a smooth barrel section 465 which provides rigidity to enable a secure fit of the pop-up seal to a toilet or toilet flange. Pop-up seal 450 and all other seals and pop-up seals may be configured to operate with or without springs.

Figure 19:
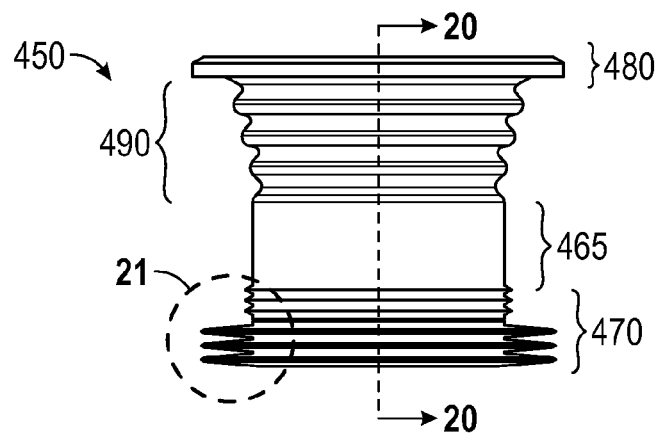
FIG. 19 depicts an elevation view of a pop-up seal for retrofit construction

FIG. 19 depicts an elevation view of a pop-up seal 450 used for retrofitting with an existing soil pipe flange. The pop-up seal 450 may comprise an upper sealing lip 480, a concentric flexible rib area 490, a smooth barrel section 465 and a lower seal area 470.

Figure 20:
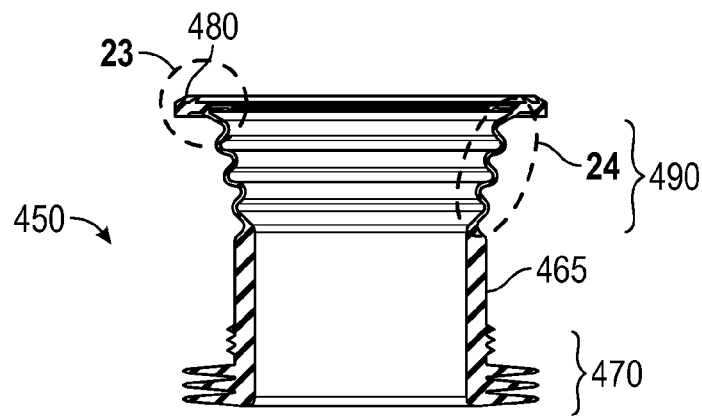
FIG. 20 depicts a sectional view of a pop-up seal for retrofit construction

FIG. 20 depicts a sectional view of FIG. 19 showing a pop-up seal used for retrofitting with an existing soil pipe flange.

Figure 21:
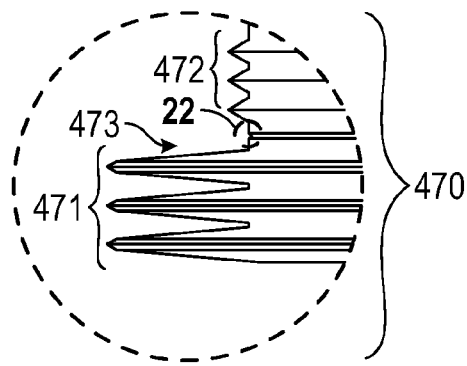
FIG. 21 depicts an enlarged view of a lower seal area

FIG. 21 depicts an expanded view of the lower seal area 470 shown in FIG. 20. The lower seal area 470 may comprise recessed sealing fins 472, an indent void 473, and extended fins 471. The configuration of the extended fins 471 overcomes shortfalls in the art as the extended fins may be removed to configure the pop-up seal to comport with a smaller diameter soil pipe flange.

The configuration of the recessed sealing fins 472 overcomes shortfalls in the art by providing frictional attachment to larger diameter soil pipe flanges. In such a configuration, the extended fins are removed. The artful and unobvious combination of recessed fins 472 disposed in a superior or upper position and extended fins 471 disposed in an inferior or lower position overcomes shortfalls in the art as one pop-up seal may be used for either smaller or larger diameter soil pipe flanges. If the lower extended fins 471 are removed, the upper recessed fins 472 remain for frictional attachment to the inside of a pipe, soil pipe flange or other plumbing component.

Figure 22:
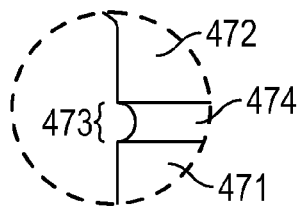
FIG. 22 depicts an enlarged view of an indent void and other pop-up seal components

FIG. 22 depicts an expanded view of the indent void 473 shown in FIG. 21. The indent void 473 may be defined by the lower portion of the recessed sealing fins, a flexible transition component 474 and an upper portion of the extended fins 471. The indent void 473 overcomes shortfalls in the prior art as the void may be used as a scoring section to detach the extended fins 471 from the pop-up seal. The lower seal area 470 overcomes shortfalls in the art by providing a flexible transition component 474 that allows the extended fins to flex or move without damage to the recessed fins.

Figure 23:
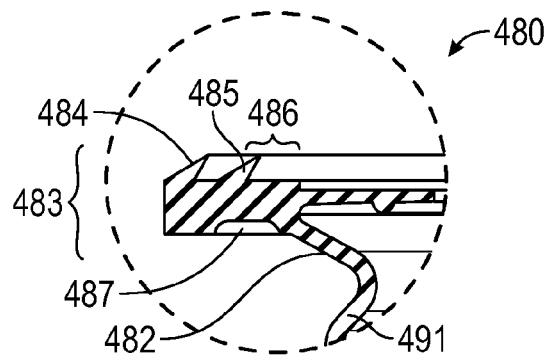
FIG. 23 depicts an enlarged view of a shoulder area of a pop-up seal

FIG. 23 depicts an expanded view of components comprising an upper sealing lip 480 of a pop-up seal used for retrofitting with an existing soil pipe flange. An upper sealing lip 480 may comprise a top leg 491 of a concentric flexible rib area, a flexible transition component 482 attached to the top leg and shoulder area 483. The upper sealing lip 480 may further comprise a shoulder area 483 and the shoulder area may comprise an upper bezel 484, an upper protrusion 485 and an upper seal area 486. The shoulder area 483 may define a void 487, or spring void, the void sometimes used to accept a top end 207 of a spring 200. The void 487 or spring void is configured to urge or produce frictional attachment to a toilet or toilet horn as the shoulder area is urged upwardly. The configuration of the void 487 or spring void further overcomes shortfalls in the art as the void if defined at the outer circumference of the pop-up seal, thus securing the pop-up seal at the outer most edges of a toilet or toilet flange to achieve the best possible watertight seal.

The overall configuration of the upper sealing lip 480, flexible transition component 482 and top leg 491 of the concentric flexible rib area overcomes shortfalls in the related art by providing a flexible and secure pop-up seal that integrates with a spring. Moreover, the flexible transition component 483 may provide a displacement buffer to prevent the concentric flexible rib area from damaging the shoulder area 483.

Figure 24:
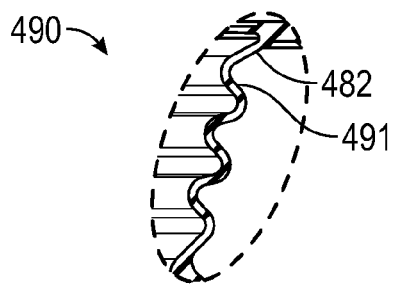
FIG. 24 depicts an enlarged view of a concentric flexible rib area of a pop-up seal

FIG. 24 depicts an expanded view of a concentric flexible rib area 490. A concentric flexible rib overcomes shortfalls in the prior art by comprising concentric components or protrusions that are larger on the bottom and progressively smaller on top. Such a configuration allows for the compact compression of the pop-up seal. A concentric flexible rib area 490 may comprise or be attached to a top leg 491 and/or a flexible transition component 482.

Figure 25:
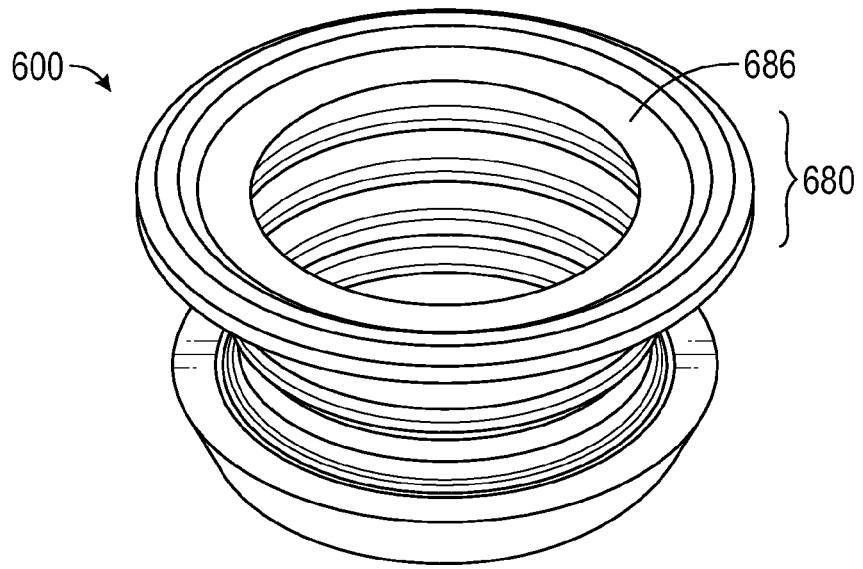
FIG. 25 depicts a perspective view of a pop-up seal for new construction

FIG. 25 depicts a perspective view of a pop-up seal 600 or rubber gasket for new construction. The pop-up seal may comprise an upper seal area 686 found within a shoulder area 680. The upper seal area 686 overcomes shortfalls in the art by providing additional means of water tight attachment to a toilet and/or toilet horn. The upper sealing lip 680 overcomes shortfalls in the related art by providing rigid support of the upper seal area and/or a seal around the circumference of a toilet or toilet horn.

Figure 26:
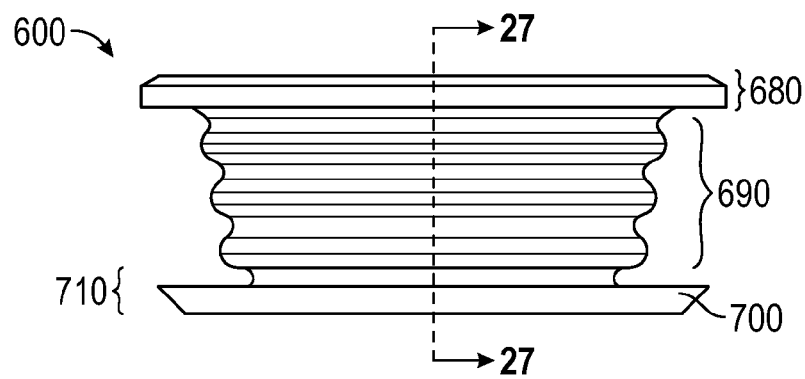
FIG. 26 depicts an elevation view of a pop-up seal for new construction

FIG. 26 depicts an elevation view of a pop-up seal 600 which may comprise a shoulder area 680, concentric flexible rib area 690 and an angle section 710.

Figure 27:
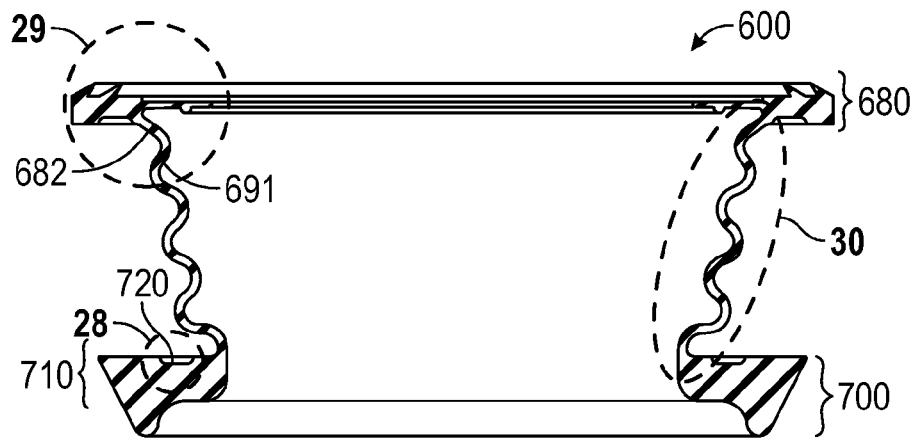
FIG. 27 depicts a sectional view of a pop-up seal for new construction

FIG. 27 depicts a sectional view of FIG. 26 and depicts various components of a pop-up seal, which may comprise an upper sealing lip 680, a flexible transition component 682, a top leg 691 of a concentric flexible rib area and a lower seal section 700. The lower seal section 700 may comprise an angle section 710 and the lower seal section 700 may define a spring recess void 720.

Figure 28:
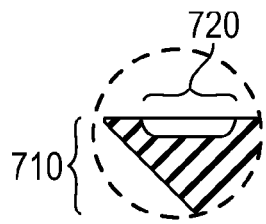
FIG. 28 depicts an expanded sectional view of a upper "V" section of a pop-up seal

FIG. 28 depicts an expanded view of a angle section 710 which may define a void 720 or spring recess void 720. The void 720 or spring recess void may accept the lower end 257 or narrow bottom side of a spring 250.

Figure 29:
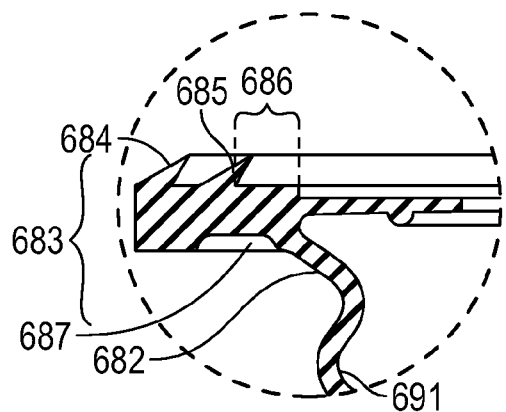
FIG. 29 depicts an expanded sectional view of a shoulder area of a pop-up seal

FIG. 29 depicts an expanded section view of a shoulder area 683 and other components of a pop-up seal. A shoulder area 683 may comprise an upper bezel 684, an upper protrusion 685, an upper seal area 686 and a void 687 or spring void defined within the shoulder area. The shoulder area may be in attachment with a flexible transition component 682 which may be attached or part of a top leg 691 of a concentric flexible rib area.

Figure 30:
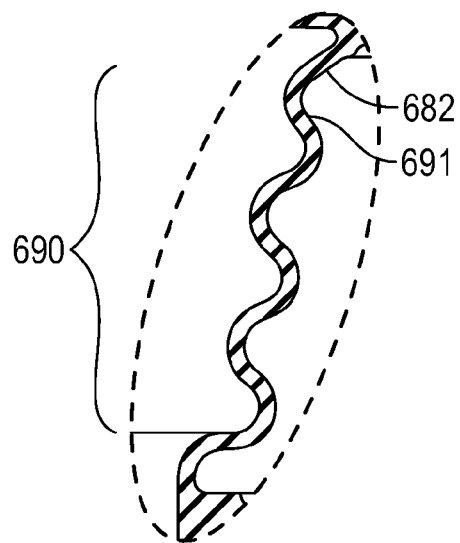
FIG. 30 depicts an expanded sectional view of a flexible rib area of a pop-up seal

FIG. 30 depicts a sectional view of a concentric flexible rib area 690 which may comprise a top leg 691 and a flexible transition component 682. A concentric flexible rib area may also be or be referred to as flexible rib components.

Disclosed Embodiments May Include the Following Items:

Item 1. A wax free system 100 for retrofit of existing toilet installations and existing soil pipe flange installations, the system comprising:
  a) a pop-up seal, the pop-up seal comprising:
    i. a lower seal area 470, the lower seal area comprising a plurality of extended fins 471 disposed inferior to a plurality of recessed fins 472;
    ii. a smooth barrel section 465 disposed superior to the recessed fins;
    iii. a plurality of concentric flexible ribs 490 disposed superior to the smooth barrel section; and
    iv. an upper sealing lip 480 disposed superior to the plurality of concentric flexible ribs, the upper sealing lip comprising shoulder area 483, the shoulder area comprising an upper bezel 484, an upper protrusion 485, a upper seal area and the shoulder area defining a spring void 487.

Item 2. The system of Item 1 wherein the concentric flexible ribs provide an upward bias to the pop-up seal upon compression of the pop-up seal.

Item 3. The system of Item 1 further comprising a spring 200.

Item 4. The system of Item 3 wherein the spring comprises a wide bottom portion 205 and a relatively narrow top portion 207.

Item 5. The system of Item 1 wherein the plurality of concentric flexible ribs comprise a flexible transition component 482, the flexible transition component connected to the shoulder area.

Item 6. The system of Item 5 wherein a top leg 491 is connected between the flexible transition component and the plurality of concentric flexible ribs.

Item 7. The system of Item 1 further comprising a flexible transition component 474 connected to the extended fins and the recessed fins.

Item 8. The system of Item 7 further comprising an indent void 473 defined by the flexible transition component, the extended fins and the recessed fins.

Item 9. A wax free system for installation of a toilet in a new construction, the system comprising:
  a) a pop-up seal, the pop-up seal comprising:
    i. a lower seal section 700 comprising an angle section 710 and a spring recess void 720, the spring recess void defined within the lower seal section;
    ii. a plurality of concentric flexible ribs 690 disposed superior to the lower seal section;
    iii. an upper sealing lip 680 disposed superior to the plurality of concentric flexible ribs, the upper sealing lip comprising a shoulder area 683, the shoulder area comprising a upper bezel 684, a upper protrusion 685, a upper seal area 686 and a spring void 687, the spring void defined within the shoulder area.

Item 10. The system of Item 9 wherein the concentric flexible ribs provide an upward bias to the pop-up seal upon compression of the pop-up seal.

Item 11. The system of Item 9 further comprising a spring 250.

Item 12. The system of Item 11 wherein the spring comprises a base section 257 and a top section 255.

Item 13. The system of Item 12 wherein the base section is of a smaller diameter as compared to the top section.

Item 14. The system of Item 9 further comprising a soil pipe flange 370, the soil pipe flange comprising a surface face 371, the surface face connected to an inner flange 380, the inner flange connected to a transition edge 382 and the transition edge connected to an inner pipe section 383.

Item 15. The system above wherein the soil pipe flange comprises a lower pipe section configured for insertion into larger diameter soil pipes and configured for accepting smaller diameter soil pipes.

These and other changes can be made to the invention in light of the above detailed description. In general, the terms used in the following claims, should not be construed to limit the invention to the specific embodiments disclosed in the specification, unless the above detailed description explicitly defines such terms.

What is claimed is:

1. A wax free system for retrofit of existing toilet installations and existing soil pipe flange installations, the system comprising:
  a) a pop-up seal, the pop-up seal comprising:
    i. a lower seal area, the lower seal area comprising a plurality of extended fins disposed inferior to a plurality of recessed fins;
    ii. a smooth barrel section disposed superior to the recessed fins;
    iii. a plurality of concentric flexible ribs disposed superior to the smooth barrel section; and
    iv. an upper sealing lip disposed superior to the plurality of concentric flexible ribs, the upper sealing lip comprising shoulder area, the shoulder area comprising an upper bezel, an upper protrusion, a upper seal area and the shoulder area defining a spring void.

2. The system of claim 1 wherein the concentric flexible ribs provide an upward bias to the pop-up seal upon compression of the pop-up seal.

3. The system of claim 1 further comprising a spring.

4. The system of claim 3 wherein the spring comprises a wide bottom portion and a relatively narrow top portion.

5. The system of claim 1 wherein the plurality of concentric flexible ribs comprise a flexible transition component, the flexible transition component connected to the shoulder area.

6. The system of claim 5 wherein a top leg is connected between the flexible transition component and the plurality of concentric flexible ribs.

7. The system of claim 1 further comprising a flexible transition component connected to the extended fins and the recessed fins.

8. The system of claim 7 further comprising an indent void defined by the flexible transition component, the extended fins and the recessed fins.

* * * * *